United States Patent
Knapp

[19]

[11] Patent Number: 5,992,902
[45] Date of Patent: Nov. 30, 1999

[54] DEVICE FOR THE CONNECTION OF A HYDRAULIC APPARATUS TO AN EXTERNAL COMPONENT

[75] Inventor: Francesco Knapp, Cava Manara, Italy

[73] Assignee: Masco Corporation of Indiana, Indianapolis, Ind.

[21] Appl. No.: 09/077,172

[22] PCT Filed: Oct. 8, 1997

[86] PCT No.: PCT/US97/18140

§ 371 Date: Dec. 21, 1998

§ 102(e) Date: Dec. 21, 1998

[87] PCT Pub. No.: WO98/16772

PCT Pub. Date: Apr. 23, 1998

[30] Foreign Application Priority Data

Oct. 14, 1996 [IT] Italy .................................. TO96A0838

[51] Int. Cl.⁶ .................................................. F16L 37/00
[52] U.S. Cl. ........................... 285/305; 285/319; 285/330
[58] Field of Search .................................. 285/305, 317, 285/319, 921, 330

[56] References Cited

U.S. PATENT DOCUMENTS

| 2,721,090 | 10/1955 | Kaman | 285/305 X |
| 4,134,605 | 1/1979 | Guhne et al. | 285/317 X |
| 4,541,657 | 9/1985 | Smyth | 285/305 |
| 5,374,088 | 12/1994 | Moretti et al. | 285/305 |
| 5,676,402 | 10/1997 | Eley et al. | 285/317 X |

*Primary Examiner*—Dave W. Arola
*Attorney, Agent, or Firm*—Myron B. Kapustij; Lloyd D. Doigan

[57] ABSTRACT

A device for the connection of a hydraulic apparatus to an external component, especially for the connection of a hang-held showerhead to a flexible water supply tube. The apparatus includes a tubular part (1) that includes a window (2). The connecting member (4) has means for its connection to the external component and has an outside diameter sized to be inserted in the tubular part (1). The connecting member (4) also includes a packing (9) for establishing a hydraulic seal between the tubular part (1) and the connecting member (4). The connecting member (4) has a recess that corresponds to the window (2) of the tubular part (1) and that at its opening has a dimension that is greater than the corresponding dimension of the window (2). Also included is an adjusting block (12) which fits in the window (2) and the recess (6) for locking the tubular part (1) of the apparatus and the connecting member (4).

6 Claims, 1 Drawing Sheet

DEVICE FOR THE CONNECTION OF A HYDRAULIC APPARATUS TO AN EXTERNAL COMPONENT

FIELD OF THE INVENTION

This invention relates to a connector device for the connection of a hydraulic apparatus such as a showerhead to an external component such as a water supply hose or pipe.

BACKGROUND OF THE INVENTION

The tubular handle of a hand-held showerhead must be connected to a flexible water supply tube or hose which is normally provided with a connecting member ending, for example, in a ring nut or a fast attachment device. Accomplishing this connection presents several problems. A first problem consists of the fact that the tubular handle of the showerhead must have a relatively large diameter so that it can be comfortably grasped, while its inside passage must have a considerably smaller diameter to be adapted to a collecting portion that is shaped so as to be able to be coupled to the collecting member that can have a reduced diameter of the water supply tube. It follows from this that the handle should be very thick, which results in difficulty in molding and requires the employment of an excessive quantity of material with a corresponding increase in weight and cost. A second problem springs from the fact that there are flexible tubes whose connecting members have different diameters and/or pitches. This creates the need for molding a plurality of showerheads with tubular handles having different connecting portions adapted to the various connecting members of the flexible tubes available on the market.

One method to solve these problems is by using a connecting member that is screwed into the end of a showerhead handle, which by itself does not have any connecting means, and is fixed in position by gluing or welding with ultrasound, and which has a connecting portion adapted to be coupled to the connecting member of a flexible tube. In this way the handle of the showerhead can be produced in a standardized form and with the proper thickness, the connecting member and only the connecting member must be produced in different shapes in order to be adapted to various connecting members of the flexible tubes available on the market. However, gluing or welding of this connecting member inside the handle of a showerhead is difficult to accomplish in industrial production, since it is difficult to get the connection to have satisfactory mechanical resistance, and if the gluing does not work perfectly then there may be rejects and waste.

It is an object of this invention to provide a device for connecting a hydraulic apparatus to an external component that is easy and convenient to make on an industrial scale in a standardized shape that is easily mounted and offers acceptable mechanical resistance and hydraulic sealing.

SUMMARY OF THE INVENTION

The instant invention comprises a connecting device for the connection of a hydraulic apparatus to an external component that comprises a tubular part of the apparatus, connecting member having means for connection to said external component, and a means for locking the tubular part of the apparatus to the connecting member. The tubular part of the apparatus has a window. The connecting member has an outside diameter sized for insertion in the tubular part of the apparatus, and a sealing packing for establishing a hydraulic seal between the tubular part of the apparatus and the connecting member. The connecting member further includes a recess that corresponds to said window of the tubular part of the apparatus and at its opening has a greater dimension than the corresponding dimension of the window. The means for locking the tubular part of the apparatus and the connecting member consists of an adjusting block that has dimensions which are adapted for being inserted in said window and in said recess and that includes protruding elastic parts capable of being passed, due to elastic deformation, through said window and thereafter expanding elastically to abut against the internal surface of said tubular part of the apparatus.

The tubular part of the apparatus can be designed with any dimensions and thickness and can be produced on an industrial scale without any need to conform to dimensions of the external component to which the apparatus must be connected. The connecting member that must have a configuration specifically adapted to the dimensions of the external component to which the apparatus is to be connected can also be easily and readily made on an industrial scale because it does not require configurations (such as undercuts) that are difficult to make. It can easily be inserted in the tubular part of the apparatus by simple threading, and establishes an effective seal due to its own packing. Finally, the locking means need not have any configurations that are difficult to make on an industrial scale and need only be screwed in through the window of the tubular part of the apparatus into the recess of the connecting member, and after being screwed in it elastically snaps into an engagement position from which it cannot come loose.

Preferably, the adjusting block comprising the locking means for the tubular part of the apparatus and the connecting member is shaped so that, when in its operating position, it completely occupies the window of the tubular part of the apparatus and is flush with the outside surface of the tubular part.

Preferably, the tubular part of the apparatus and the connecting member have complementary configurations so arranged as to pre-establish a single possible coupling position in which the recess of the connecting member is in a position corresponding to and aligned with the window of the tubular part of the apparatus. This ensures that once the connecting member has been screwed into the tubular part of the apparatus, the window and the recess will be aligned and the locking means can be readily inserted and engaged.

The complementary configurations may simply consist of at least one tab that protrudes radially from the connecting member and at least one corresponding recess in the tubular part of the apparatus. If there are a plurality of protruding tabs and recesses, then at least one of them must have a shape and/or dimensions and/or arrangement that will differ from the others so as to ensure only one possible engagement position.

Various components of the connecting device of the invention can advantageously be made of plastic material. However, it may be advantageous to make the locking means metallic either in its entirety or in part.

DESCRIPTION OF THE PREFERRED EMBODIMENTS

Figure 1:
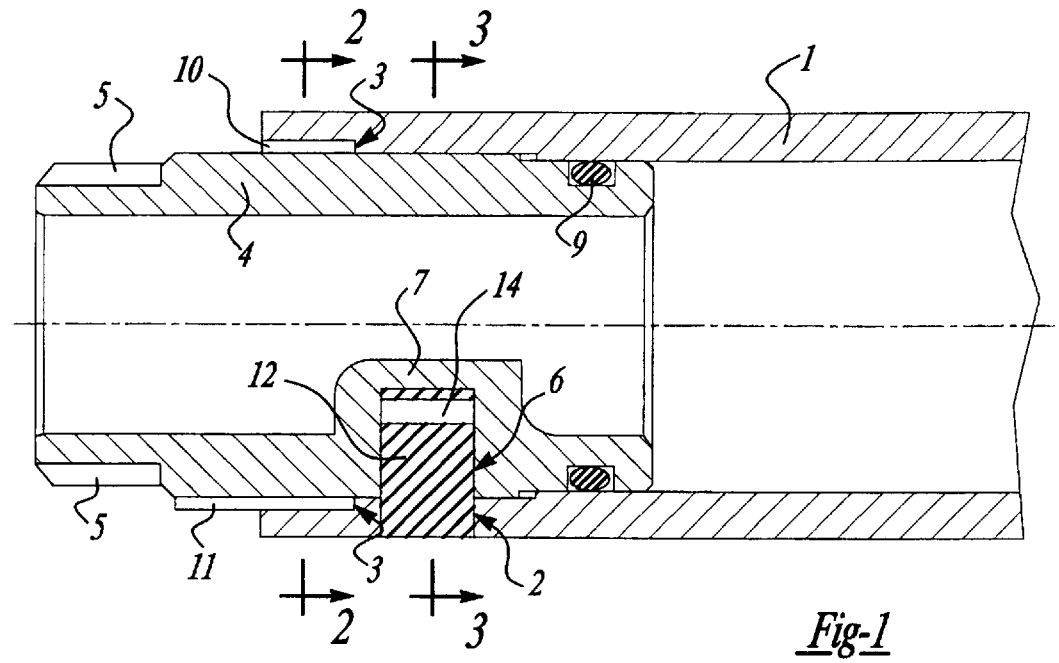
FIG. 1 is a side elevational view in section of the end of a tubular handle of a hand-held showerhead with a connecting device of the instant invention.
Figure 2:
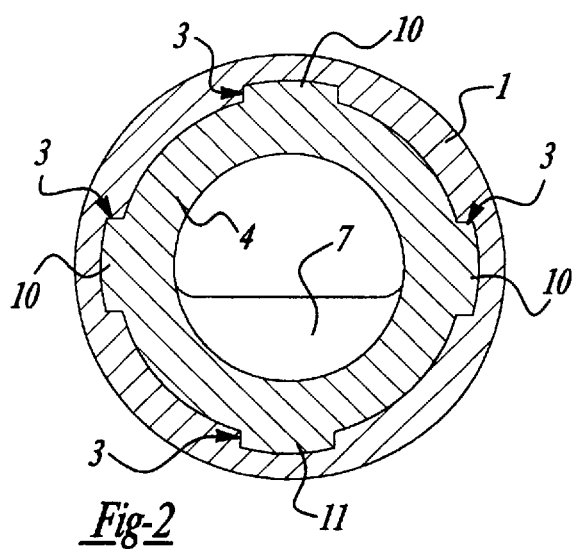
FIG. 2 is a view taken along line II—II in FIG. 1.

The example illustrated pertains to a hand-held showerhead intended for connection to a flexible water supply tube whose connecting member has a ring nut. The flexible tube and its connecting member are not shown.

In the figures, reference numeral 1 refers to the handle of a hand-held showerhead whose other parts are not shown because they are not relevant to this invention. Handle 1 is tubular having a simple passage through which water reaches the showerhead. Handle 1 of the showerhead does not have any specific configuration intended to be coupled directly to the ring nut of the flexible tube. This is why it can be designed and made in a standardized fashion (various models are provided for each showerhead model) with suitable diameters and thicknesses.

The illustrated terminal part of the tubular handle has specific configurations in accordance with the instant invention and comprises an integral part of the connecting device. Tubular handle 1, at a certain distance from its free end, has a window 2 for locking means described below. Furthermore, tubular handle 1 preferably has recesses 3, which will be described later, and are situated in the mouth of its central passage.

The device of the instant invention further includes a connecting member 4 that has a substantially tubular shape. At one end connecting member 4 is provided with means such as, for example, threads 5 that cooperate with the connecting member such as, for example, a ring nut of the flexible water supply tube. As discussed earlier, flexible tubes are available on the market having different types of connecting members with different diameters and pitches. Connecting member 4 cannot therefore be standardized and must be made in various versions so as to be properly adapted to different showerhead models and different tube models. When showerheads are produced in various models connecting member 4 can be used on different showerhead models. Connecting member 4 thus is an element that makes it possible to make a given showerhead model compatible with a given tube model.

Connecting member 4 can be inserted inside tubular handle 1 by simply screwing it in (as shown in the figures). Member 4 is provided with a ring-shaped packing 9 to provide a seal with the central passage of handle 1. Connecting member 4 has a recess 6 in an interiorly extending protuberance 7 in a position corresponding to window 2 of handle 1 when connecting member 4 is inserted into handle 1. Mouth 8 of recess 6 has a larger dimension than the corresponding dimension of window 2. Therefore, a part 1' of the inside surface of handle 1 adjacent to window 2 remains exposed when connecting member 4 is inserted in handle 1.

Since connecting member 4 is inserted in handle 1 so that its recess 6 is aligned with window 1 of the handle, it is advantageous (although not always indispensable) that, between handle 1 and connecting member 4, means be provided to establish a single position in which connecting member 4 can be inserted in handle 1. These means can consist of simple tabs 10, 11 on connecting member 4 that fit into recesses 3 of handle 1. The single insertion position is ensured by tab 11 having a shape and/or dimensions and/or arrangement different from tabs 10. In the embodiment illustrated in the figures it is narrower than the other tabs. Furthermore, tab 11 can extend beyond the corresponding recess 3, comprising an indicator that can be used to determine the position in which the showerhead can be mounted on a support serving to transform the hand-held showerhead into a showerhead that is installed in an operationally fixed position.

The instant invention also includes a means for locking handle 1 and connecting member 4 when the latter has been inserted in the correct operating position in handle 1. This locking means consists of an adjusting block 12 having a shape adapted to be inserted through window 2 of handle 1 and in recess 6 of connecting member 4 so as to immobilize both handle 1 and connecting member 4. Adjusting block 12 has elastically deformable appendices 13 that protrude with respect to the outline of window 2 but that can pass through it. Therefore, when adjusting block 12 is inserted in recess 6 the moment it has passed through window 2 the elastic appendices 13 snap into position by resting against portions 1' of the inside surface of handle 1 left uncovered by the expanded part of mouth 8 of recess 6. Once this position has been reached (as shown in FIG. 3) adjusting block 12 can no longer be extracted and locks handle 1 to connecting member 4.

Figure 3:
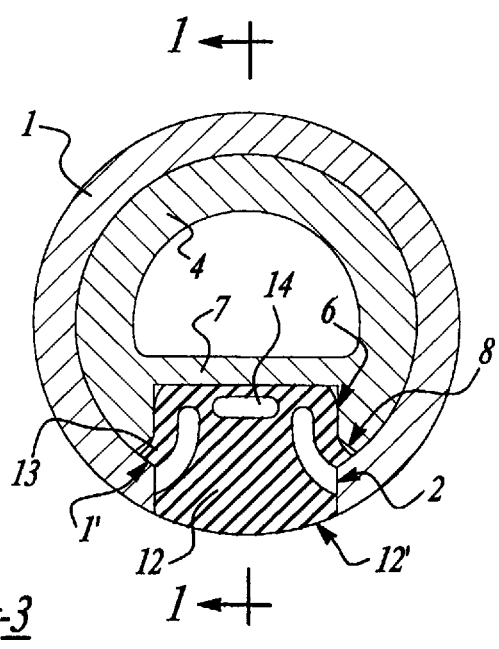
FIG. 3 is a view taken along line III—III in FIG. 1.

In the embodiment shown, elastic appendices 13 and portions 1' of the inside surface of handle 1 left uncovered by expanded part 8 of the mouth of recess 6 extend laterally to window 2 in a transverse section of handle 1, as shown in FIG. 3. In other words, the appendices 13 extend from adjusting block 12, diverging from it in a plane that is perpendicular to the axis of tubular handle 1. It is, however, understood that these configurations could instead (or also) be provided laterally to window 2 in an axial cross-section of handle 1. In other words, appendices 13 would extend from adjusting block 12 diverging from it in a plane containing the axis of tubular handle 1. These configurations would therefore appear in FIG. 1 instead of (or in addition to) those in FIG. 3.

It is advantageous for the outside surface 12' of adjusting block 12 to have a shape which continues and completes the line of handle 1, as shown in FIGS. 1 and 3. Additionally, the external surface 12' of adjusting block 12 can be arranged as to receive imprints, for example, a trademark, the indication of an article reference, and the like.

Adjusting block 12 can be made of a suitable plastic or other materials. If it is made of an elastic metal its dimensions could be reduced. Adjusting block 12 can also be a composite structure, for example, with a body of plastic material and with metallic elastic appendices or appendices comprised of a different plastic substance.

This adjusting block 12 is made in solid form, then a cavity 14 (that could also be open toward the interior of adjusting block 12) can be provided so as to increase the deformability of the material of adjusting block 12 in relation to appendices 13, if that appears desirable.

The instant invention makes it possible to simplify the production and installation of one or several showerhead models for connection with one or the other type of flexible water supply tubes. Packing 8 ensures perfect sealing action by the connection, while locking means 12 ensures permanent connection between the parts with adequate mechanical resistance. The main parts of the device of the invention can be made of a suitable plastic substance. This can be done without any production problems, because there are no configurations that are difficult to mold such as undercuts and the like. In this respect it should be noted that the elastic snap locking of appendices 13 of adjusting block 12 on the portions of surface 8' are accomplished without having to provide undercuts that are usually necessary to make elastic snap couplings.

The invention therefore solves the problems of connecting a hand-held showerhead to appropriate flexible tubing. It is to be understood that this particular use is not exclusive and that the invention can be employed in a general fashion in many other cases requiring the connection of a hydraulic apparatus to an external component that presents similar problems.

While the invention has been described with reference to details of the illustrated embodiment, it should be understood that such details are not intended to limit the scope of the invention. Variations and modifications of the present invention are possible without departing from the scope and spirit of the invention as defined by the appended claims.

What is claimed is:

1. A connecting device for the connection of a hydraulic apparatus containing a tubular part having a window in its outer wall and an external component, the connecting device comprising:

a connecting member having
      means for connection to said external component,
      an outside diameter sized for insertion into the tubular part of the apparatus,
      a sealing member adapted for establishing a hydraulic seal between the tubular part of the apparatus and the connecting member, and
      a recess that corresponds to and is alignable with said window, the recess having an opening that has a dimension greater than the corresponding dimension of the window, thereby forming a ledge with the interior wall of said tubular part when the connecting member is positioned within the tubular part, and
   means for locking together the tubular part of the apparatus and the connecting member comprising
      a locking block that is sized for being housed in said window and in said recess, the locking block having protruding elastic parts that are adapted to (a)pass through said window and (b) expand elastically to come to rest against said ledge of said wall of said tubular part.

2. The device of claim 1 wherein said adjusting block is sized so that when in its operating position it completely occupies said window and forms a flush surface with the tubular part's outer wall.

3. The device of claim 1 wherein said tubular part and connecting member have complementary configurations arranged so as to establish a single coupling position in which said recess of said connecting member is aligned with said window of said tubular part.

4. The device of claim 3 wherein said complementary configurations comprise at least one tab that protrudes radially from said connecting member and at least one corresponding recess in said tubular part.

5. The device of claim 1 wherein at least some parts of the connecting device are made of plastic.

6. The device of claim 1 wherein said hydraulic apparatus is a hand-held showerhead and wherein said external component is a flexible water supply tube.

* * * * *